United States Patent
Beauvillain (10) Patent No.: US 11,747,804 B2
(45) Date of Patent: Sep. 5, 2023

(54) REMOTE MONITORING DEVICE FOR A FLEET OF AUTONOMOUS MOTOR VEHICLES, TRANSPORT SYSTEM AND LIMITING METHOD THEREFOR

(71) Applicant: TRANSDEV GROUP, Issy les Moulineaux (FR)

(72) Inventor: Alexis Beauvillain, Massy (FR)

(73) Assignee: TRANSDEV GROUP INNOVATION, Issy les Moulineaux (FR)

(*) Notice: Subject to any disclaimer, the term of this patent is extended or adjusted under 35 U.S.C. 154(b) by 527 days.

(21) Appl. No.: 16/794,822

(22) Filed: Feb. 19, 2020

(65) Prior Publication Data

US 2020/0272142 A1  Aug. 27, 2020

(30) Foreign Application Priority Data

Feb. 25, 2019 (FR) ...................................... 19 01895

(51) Int. Cl.
| | |
|---|---|
| *G05D 1/00* | (2006.01) |
| *B60W 50/12* | (2012.01) |
| *B60W 50/14* | (2020.01) |
| *G08G 1/127* | (2006.01) |

(Continued)

(52) U.S. Cl.
CPC ............. *G05D 1/005* (2013.01); *B60W 50/12* (2013.01); *B60W 50/14* (2013.01); *G05D 1/0016* (2013.01); *G05D 1/0022* (2013.01); *G05D 1/0027* (2013.01); *G05D 1/0291* (2013.01);
(Continued)

(58) Field of Classification Search
CPC .... G05D 1/005; G05D 1/0016; G05D 1/0022; G05D 1/0027; G05D 1/0291; G05D 1/0297; B60W 50/12; B60W 50/14; G06V 20/58; G08G 1/127
See application file for complete search history.

(56) References Cited

U.S. PATENT DOCUMENTS

| | | | |
|---|---|---|---|
| 2011/0130916 A1* | 6/2011 | Mayer .................... | B60L 3/12 903/903 |
| 2013/0030606 A1 | 1/2013 | Mudalige et al. | |

(Continued)

FOREIGN PATENT DOCUMENTS

EP 0884666 A1 12/1998

OTHER PUBLICATIONS

Search Report for French Application No. 19 01895 dated Nov. 8, 2019.

*Primary Examiner* — Abby Y Lin
*Assistant Examiner* — Renee LaRose
(74) *Attorney, Agent, or Firm* — Pearne & Gordon LLP (57) ABSTRACT

A remote monitoring device is provided for a fleet of autonomous motor vehicles. The monitoring device is able to receive at least one piece of information from at least a first sensor monitoring the environment of a vehicle of interest, the monitoring device being able to display the information on a display screen. The monitoring device comprises: a processing module configured to determine a measuring uncertainty of the information sent by the first sensor and/or to measure a lag between the sending of the information by the first sensor and the display of the information on the display screen; and a limiting module configured to limit the piloting of said vehicle of interest by the operator as a function of the determined uncertainty and/or the measured lag.

17 Claims, 2 Drawing Sheets

(51) Int. Cl.
*G06V 20/58* (2022.01)
*G05D 1/02* (2020.01)

(52) U.S. Cl.
CPC ............ *G06V 20/58* (2022.01); *G08G 1/127* (2013.01); *B60W 2050/146* (2013.01)

(56) References Cited

U.S. PATENT DOCUMENTS

| | | | |
|---|---|---|---|
| 2015/0193994 A1* | 7/2015 | Mcquade | G07C 5/008 701/29.3 |
| 2018/0231982 A1 | 8/2018 | Yunoki et al. | |
| 2019/0262992 A1* | 8/2019 | Kim | G05D 1/0246 |

* cited by examiner

REMOTE MONITORING DEVICE FOR A FLEET OF AUTONOMOUS MOTOR VEHICLES, TRANSPORT SYSTEM AND LIMITING METHOD THEREFOR

CROSS-REFERENCE TO RELATED APPLICATIONS

This application is a U.S. non-provisional application claiming the benefit of French Application No. 19 01895, filed on Feb. 25, 2019, which is incorporated herein by reference in its entirety.

FIELD OF THE INVENTION

The present invention relates to a remote monitoring device for a fleet of autonomous motor vehicles making it possible for an operator to pilot the fleet remotely and comprising at least one display screen, the monitoring device being able to receive at least one piece of information from at least a first sensor monitoring the environment of a vehicle of interest in the fleet, the monitoring device being able to display the at least one piece of information on the display screen.

The invention also relates to a transport system comprising such a monitoring device and a fleet of autonomous motor vehicles monitored remotely by the monitoring device.

The invention also relates to a limiting method implemented by such a monitoring device.

The invention also relates to a non-transitory computer-readable medium including a computer program product including the software instructions which, when implemented by computer equipment, implement such a limiting method.

The invention in particular relates to the field of autonomous motor vehicles, in particular autonomous motor vehicles having a level of automation greater than or equal to 3 on the scale of the Organisation Internationale des Constructeurs Automobiles [International Organization of Motor Vehicle Manufacturers] (OICA).

BACKGROUND

In particular, the invention relates to the remote piloting of a vehicle by an operator. It is known, when an autonomous vehicle encounters a problematic situation, to allow a remote operator to take control of the vehicle in order to resolve this situation. For example, when a vehicle encounters an obstacle located on a path delimited by a sidewalk and a solid white line, the vehicle may potentially be unable to choose a strategy for bypassing the obstacle respecting the imposed safety setpoints. The operator taking control of the vehicle can then better take account of the situation and send a setpoint to the vehicle making it possible to resolve the problematic situation while ensuring the safety of the passengers of the vehicle.

However, the safety of the passengers of the vehicle during this remote piloting can be further improved, in particular in case of setpoint sent to the vehicle to bypass an obstacle or cross a white line.

SUMMARY

One aim of the invention is thus to supply an electronic monitoring device allowing improved safety for the passengers of the vehicle.

To that end, the invention relates to an electronic monitoring device of the aforementioned type, wherein the monitoring device comprises a processing module configured to determine a measuring uncertainty of the at least one piece of information sent by the at least one first sensor and/or to measure a lag between the sending of the at least one piece of information by the at least one first sensor and the display of the at least one piece of information on the display screen; and a limiting module configured to limit the piloting of said vehicle of interest by the operator as a function of the determined uncertainty and/or the measured lag.

According to specific embodiments of the invention, the monitoring device also comprises one or more of the following features, considered alone or according to any technically possible combination(s):

- the at least one piece of information is chosen from the group consisting of: a geographical position of the vehicle of interest; a speed of the vehicle of interest; an acceleration of the vehicle of interest; a geographical position of an element surrounding the vehicle of interest; a speed of an element surrounding the vehicle of interest; an acceleration of an element surrounding the vehicle of interest; and a classification of an element surrounding the vehicle of interest;
- the element surrounding the vehicle of interest is chosen from among the group consisting of: an object located in the surroundings of the vehicle of interest; an individual located in the surroundings of the vehicle of interest; and an obstacle encountered by the vehicle of interest;
- the limiting module is configured to limit the piloting when at least one of the uncertainties exceeds an associated uncertainty threshold and/or when the measured lag exceeds an associated lag threshold;
- the monitoring device comprises a control module able to send at least one movement command to at least one vehicle of the fleet, the limiting module being able to block the sending of any movement command to the vehicle of interest;
- the monitoring device is able to receive at least one piece of information from at least one second sensor, the second sensor being chosen from the group consisting of: a sensor embedded on board one of the autonomous vehicles and an infrastructure sensor positioned outside the autonomous vehicles, the monitoring device comprising a load shedding module able to deactivate the communication between the monitoring device and the at least one second sensor as a function of the determined uncertainty and/or the measured lag;
- the monitoring device comprises a load shedding module able to deactivate the communication between the monitoring device and at least one of the vehicles of the fleet as a function of the measured lag; and
- the monitoring device comprises an alert module able to emit an alert signal as a function of the determined uncertainty and/or the calculated lag, the display screen being able to display the alert signal.

The invention also relates to a transport system comprising a monitoring device as defined above and a fleet of autonomous motor vehicles monitored remotely by the monitoring device.

The invention also relates to a limiting method implemented using a remote monitoring device for a fleet of autonomous motor vehicles, the monitoring device allowing the remote piloting of the fleet by an operator and comprising at least one display screen, the limiting method comprising the following steps:

receiving at least one piece of information from at least one first sensor monitoring the environment of a vehicle of interest of the fleet;

displaying the at least one piece of information on a display screen;

determining a measuring uncertainty of the at least one piece of information sent by the at least one first sensor and/or measuring a lag between the sending of the at least one piece of information by the at least one first sensor and the display of the at least one piece of information on the display screen; and limiting the piloting of said vehicle of interest by the operator as a function of the determined uncertainty and/or the measured lag.

The invention also relates to a non-transitory computer-readable medium including a computer program including software instructions which, when executed by a computer, implement a limiting method as defined above.

BRIEF DESCRIPTION OF THE DRAWINGS

The invention will be better understood using the following description, provided solely as an example and done in reference to the appended figures, in which.

DETAILED DESCRIPTION

Figure 1:
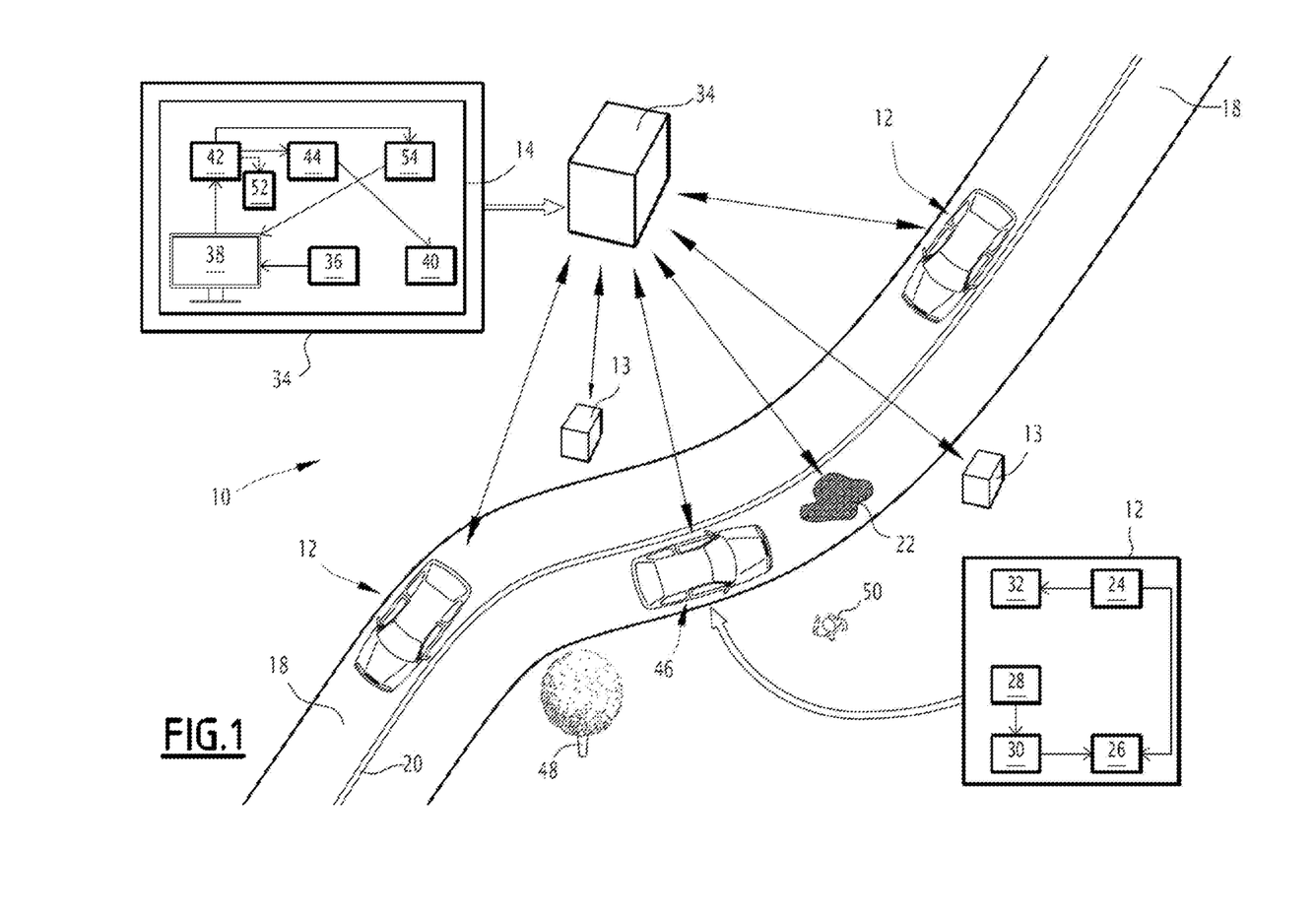
FIG. 1 is a schematic view of a transport system according to the invention.

As shown in FIG. 1, a transport system 10 comprises a fleet of at least one vehicle 12, at least one sensor 13, also called infrastructure sensor, and a device 14 for remote monitoring of the fleet of vehicles 12 for the remote piloting of the fleet by an operator.

Each motor vehicle 12 is able to circulate along circulation path(s) 18. Each circulation path 18 is part of a roadway allocated to vehicle traffic in a direction of travel. The roadway for example comprises a single traffic lane 18. In a variant, as shown in FIG. 1, the roadway comprises two traffic lanes 18 associated with opposite directions of travel and separated by a solid white line 20. In another variant, the roadway comprises two to four traffic lanes 18 in each direction of travel. Each traffic lane 18 is typically embodied by a marking on the ground, such as a white line, for example.

In the example illustrated in FIG. 1, an obstacle 22 is located in one of the traffic lanes 18. The obstacle 22 is able to hinder the travel of one of the vehicles 12 in the traffic lane 18. The obstacle 22 is for example a stone, dirt, part of a vehicle body, a plastic bag or a cavity in said traffic lane 18.

Hereinafter, a single vehicle 12 will be described. One skilled in the art will understand that the other vehicles 12 of the fleet are similar.

The vehicle 12 comprises, in a known manner, rear wheels, front wheels, a motor mechanically connected via a transmission chain to the rear and/or front wheels for the driving of said wheels in rotation around their axis, a steering system, suitable for acting on the front and/or rear wheels of the vehicle 12 so as to modify the orientation of its trajectory, and a braking system, suitable for exerting a braking force on the wheels of the vehicle 12.

The vehicle 12 is typically made up of a traction and/or electric propulsion vehicle. To that end, the motor is made up of an electric motor, and the vehicle 12 comprises an electric battery electrically connected to the motor to supply the motor with electricity.

The vehicle 12 is an autonomous motor vehicle. To that end, the vehicle comprises at least one sensor 24, also called embedded sensor, monitoring the environment of the vehicle 12. The or each sensor 24 is able to detect at least one piece of information relative to the vehicle 12 or the environment of the vehicle 12. In particular, the at least one sensor 24 is able to detect the obstacle 22 in the traffic lane 18. Each sensor 24 is for example a camera, an infrared sensor, a radar, a LIDAR, a temperature sensor, a pressure sensor and/or a humidity sensor.

The vehicle 12 further comprises an electronic autonomous driving device 26 suitable for piloting the vehicle 12 autonomously by receiving information on the environment of the vehicle 12 by means of sensors 24 and by acting on the motor, the steering system and the braking system, so as to modify the speed, the acceleration and the trajectory of the vehicle 12 in response to the received information.

The autonomous vehicle 12 preferably has a level of automation greater than or equal to 3 on the scale of the Organisation Internationale des Constructeurs Automobiles (OICA). The level of automation is then equal to 3, that is to say, a conditional automation, or equal to 4, that is to say, a high automation, or equal to 5, that is to say, a full automation.

According to the OICA scale, level 3 for conditional automation corresponds to a level for which the driver does not need to perform continuous monitoring of the driving environment, while still having to be able to take back control of the autonomous motor vehicle 12. According to this level 3, the electronic autonomous driving device 26, embedded on board the autonomous motor vehicle 12, then performs the longitudinal and lateral driving in a defined usage case and is capable of recognizing its performance limits to then ask the driver to take back dynamic driving with a sufficient time margin.

The high level of automation 4 then corresponds to a level for which the driver is not required in a defined usage case. According to this level 4, the electronic autonomous driving system 26, embedded on board the autonomous motor vehicle 12, then performs the dynamic longitudinal and lateral driving in all situations in this defined usage case.

The full automation level 5 lastly corresponds to a level for which the electronic autonomous driving system 26, embedded on board the autonomous motor vehicle 12, performs the dynamic lateral and longitudinal driving in all situations encountered by the autonomous motor vehicle 12, throughout its entire journey. No driver is then required.

The vehicle 12 further comprises a command receiving module 28, a transmission module 30 and a sending module 32.

The command receiving module 28 is able to receive at least one movement command from the monitoring device 14.

A movement command is for example a command to modify the trajectory of the vehicle 12, a command to bypass the obstacle 22, a command to ignore the obstacle 22, a command to wait, a command to slow down or a command to stop the vehicle 12.

The command receiving module 28 is able to receive at least one movement command from the monitoring device 30.

The transmission module 30 is able to send at least one movement command to the rest of the vehicle 12.

In particular, the transmission module 30 is able to send the command to the electronic autonomous driving device 26 of the vehicle 12. The electronic autonomous driving device 26 is then configured to implement the command.

The sending module 32 is able to receive the at least one piece of information detected by the at least one embedded sensor 24 in one of the vehicles 12.

The sending module 32 is able to send the at least one piece of information to the monitoring device 14.

In one advantageous embodiment, the sending module 32 is further able to calculate a measuring uncertainty of the at least one piece of received information.

The measuring uncertainty is a characteristic value of the dispersion of the measurements of a property or a probability that the received information is accurate.

The sending module 32 calculates this uncertainty using statistical methods known in themselves.

The sending module 32 is then able to send the at least one piece of information to the monitoring device 14 as well as the associated measuring uncertainty.

The electronic autonomous driving device 26, the command receiving module 28, the transmission module 30 and the sending module 32 are typically made in the form of software stored in a memory (not shown) and able to be executed by a processor (not shown) associated with said memory, the memory and the processor together forming an information processing unit included in the vehicle 12. In a variant, the electronic autonomous driving device 26, the command receiving module 28, the transmission module 30 and the sending module 32 are made in the form of a programmable logic component or in the form of a dedicated integrated circuit included in the car 12.

Each infrastructure sensor 13 is positioned along the traffic lanes 18. In particular, each infrastructure sensor 13 is located at a distance of less than 500 m from the traffic lanes 18. Each infrastructure sensor 13 is for example stationary, in the sense that its geographical position does not vary over time, while allowing a rotation of the infrastructure sensor 13 around at least one axis.

Each infrastructure sensor 13 is able to detect at least one piece of information on the environment of the infrastructure sensor 13 and/or at least one of the vehicles 12 of the fleet. In particular, each infrastructure sensor 13 is for example a camera, a temperature sensor, a pressure sensor, a humidity sensor or a lidar.

Each infrastructure sensor 13 is able to send the at least one piece of information to the monitoring device 14.

Advantageously, the infrastructure sensor 13 is able to timestamp the at least one piece of information at the moment when it is sent.

The monitoring device 14 is positioned in a remote control station 34. The control station 34 is located at a distance from the vehicles 12 and ensures the control of the vehicle 12 by an operator.

The monitoring device 14 and the vehicles 12 are able to communicate with one another.

The monitoring device 14 comprises an information receiving module 36, at least one display screen 38, a control module 40, a processing module 42 and a limiting module 44.

The information receiving module 36 is able to receive at least one piece of information from at least one first sensor monitoring the environment of a vehicle of interest 46 of the fleet of vehicles 12.

The vehicle of interest 46 is one of the vehicles 12 traveling on the traffic lanes 18.

The first sensor is advantageously chosen from among the group consisting of: a sensor 24 embedded in the vehicle of interest 46 or one of the infrastructure sensors 13 positioned outside the autonomous vehicles 12.

The at least one piece of information received by the monitoring device 14 is chosen from the group consisting of:
- a geographical position of the vehicle of interest 46;
- a speed of the vehicle of interest 46;
- an acceleration of the vehicle of interest 46;
- a geographical position of an element 47 surrounding the vehicle of interest 46;
- a speed of an element 47 surrounding the vehicle of interest 46;
- an acceleration of an element 47 surrounding the vehicle of interest 46; and
- a classification of an element 47 surrounding the vehicle of interest 46.

"Surrounding" means that the element 47 is located at a distance for example of less than 100 m from the vehicle of interest 46.

The element 47 surrounding the vehicle of interest 46 is chosen from the group consisting of:
- an object 48 located in the surroundings of the vehicle of interest 46;
- an individual 50 located in the surroundings of the vehicle of interest 46; and
- an obstacle 22 encountered by the vehicle of interest 46.

"Surroundings of the vehicle of interest 46" here and hereinafter refers to a portion of the area centered on the vehicle of interest 46 and having a determined radius, for example less than 100 m.

The geographical position is for example defined by at least two geographical coordinates, such as the longitudinal latitude.

The object 48 is for example an object able to move on the traffic lanes 18 such as one of the vehicles 12, a motor vehicle that is not part of the fleet, a motorcycle, a bicycle or a stationary object relative to the traffic lanes 18 such as a tree, a post or an obstacle 22.

The individual 50 is for example a pedestrian walking on a sidewalk running alongside the traffic lanes 18, a worker working on a worksite on the traffic lanes or a police officer regulating traffic on the traffic lanes 18.

The classification of the element 47 is the assignment of a predetermined category to the element 47. The predetermined category is for example chosen from the group consisting of: a pedestrian, a cyclist, a motorcycle, a car, a truck and a stationary object.

In one advantageous embodiment, the monitoring device 14 is further able to receive at least one piece of information from at least one second sensor. The second sensor is chosen from among the group consisting of: an embedded sensor 24 in one of the autonomous vehicles 12 and one of the infrastructure sensors 13 positioned outside the autonomous vehicles 12.

Thus, the information receiving module 36 is able to receive information from at least two embedded sensors 24 or able to receive information from at least two infrastructure sensors 13 or able to receive information from at least one embedded sensor 24 and at least one of the infrastructure sensors 13.

Each display screen 38 is able to display the at least one piece of information received by the monitoring device 14.

The control module 40 is able to send at least one movement command to the fleet of vehicles 12.

The movement command is advantageously determined by the operator as a function of the at least one piece of information displayed on the display screen 38.

The processing module 42 is configured to determine a measuring uncertainty of the at least one piece of information sent by the at least one first sensor and/or to measure a lag between the sending of the at least one piece of information by the at least one first sensor and the display of the at least one piece of information on the display screen 38.

When the sending module 32 of the vehicle of interest 46 is able to calculate the measuring uncertainty of the information that it sends to the monitoring device 14, the processing module 42 is able to determine the measuring uncertainty only by receiving the uncertainty calculated by the sending module 32.

In a variant, when the sending module 32 is able to send only the information without the associated uncertainty, the processing module 42 is able to determine the uncertainty by calculating this measuring uncertainty from the at least one received piece of information. The processing module 42 calculates this uncertainty using statistical methods known in themselves.

The lag is typically measured by difference between the sending time of the at least one piece of information by the first sensor and the display time of the at least one piece of information on the display screen 38. To that end, the first sensor is for example able to timestamp, via the sending module 32, the at least one piece of information at the time of its sending and the command receiving module 36 is able to timestamp the command at the time of its reception. The processing module 42 is then able to read the two timestamps and obtain the difference between them in order to determine the lag.

The processing module 42 is able to send the at least one received piece of information with the associated measuring uncertainty and/or measured lag to the limiting module 44.

The limiting module 44 is configured to limit the piloting of said vehicle of interest 46 by the operator as a function of the determined uncertainty and/or the measured lag.

In particular, the limiting module 44 is able to block the sending of any movement command to the vehicle 12 of interest when at least one of the determined uncertainties is above a predetermined uncertainty threshold. The value of the uncertainty threshold is specific to each type of information.

As an example, the uncertainty threshold associated with a geographical position of an element 47 surrounding the vehicle of interest 46 is greater than 1 m.

As another example, the uncertainty threshold associated with a speed of an element 47 is greater than 10 km/h.

As another example, the uncertainty threshold associated with the categorization of an element 47 is greater than 30% uncertainty on the category of the element 47.

In a variant or additionally, the limiting module 44 is able to block the sending of any movement command to the vehicle 12 of interest when the measured lag is above a predetermined lag threshold. The lag threshold is for example greater than 200 ms.

The blocking of the command sending makes it possible to avoid a dangerous movement of the vehicle of interest 12 when the received information has too high an uncertainty and/or the reception of this information by the monitoring device 14 is done with too great a delay relative to the sending thereof by the first sensor. Indeed, such an uncertainty and/or such a delay can cause the determination of a movement setpoint that would not be relevant in light of the current reality of the environment of the vehicle 12 of interest. The blocking of the command sending then makes it possible to guarantee the safety of the passengers of the vehicle of interest 46.

The monitoring device 14 further advantageously comprises a load shedding module 52.

The load shedding module 52 is able to receive, from the processing module 42, the at least one piece of information with the measured lag.

The load shedding module 52 is also able to deactivate the communication between the monitoring device 14 and at least one of the vehicles 12 of the fleet, in particular a vehicle 12 different from the vehicle of interest 46, or with at least one of the infrastructure sensors 13, as a function of the measured lag.

In particular, the load shedding module 52 is able to deactivate the communication between the monitoring device 14 and a vehicle 12 presenting a safety risk for the passengers that is less serious than for the vehicle of interest 46.

Deactivating the communication with at least one of the vehicles 12 or at least one of the infrastructure sensors 13 makes it possible to decrease the stream of information escalated to the monitoring device 14 by the cars 12 and the sensors 13 and thus to decrease the lag in the communication between the monitoring device 14 and the vehicle of interest 46.

In one advantageous embodiment, when the monitoring device 14 is able to receive information from at least one second sensor 24, 13, the load shedding module 52 is able to deactivate the communication between the monitoring device 14 and the at least one second sensor 24, 13 as a function of the determined uncertainty and/or the measured lag.

In particular, the load shedding module 52 is able to determine a criticality level associated with each sensor 24, 13. The criticality level reflects the potential impact of the information escalated by the sensor 24, 13 on the driving of the vehicle of interest 46 by the operator. The criticality level of a sensor 24, 13 is higher when the at least one escalated piece of information will have a strong impact on the setpoints sent by the operator. Thus, as an example, the criticality level associated with a camera is higher than that associated with a temperature sensor.

The load shedding module 52 is able to deactivate the communication between the monitoring device 14 and the sensor(s) 24, 13 having the lowest criticality level.

Deactivating the communication with at least one second sensor 24, 13 makes it possible to decrease the stream of information escalated by the sensor(s) 24, 13 to the monitoring device 14 and thus to decrease the lag in the communication.

In a variant or additionally, the load shedding module 52 is able to deactivate the communication between the monitoring device 14 and the sensor(s) 24, 13 escalating information having an uncertainty above the associated uncertainty threshold and having a low criticality level.

This deactivation makes it possible not to display information having too great an uncertainty while not being very critical, and thus to avoid limiting the piloting.

Advantageously, the electronic monitoring device 14 further comprises an alert module 54.

The alert module 54 is able to receive, from the processing module 42, the at least one piece of information with the associated measuring uncertainty and/or the measured lag.

The alert module 54 is able to emit an alert signal as a function of the determined uncertainty and/or the measured lag. In particular, the alert module 54 is able to send the alert signal to the at least one display screen 38, the display screen 38 being able to display the alert signal.

The alert module 54 is advantageously able to emit an alert signal when the determined uncertainty is above a predetermined alert threshold specific to each type of information.

As an example, the alert threshold associated with a geographical position of an element 47 is equal to 75 cm.

As another example, the alert threshold associated with a speed of an element 47 is equal to 8 km/h.

As another example, the alert threshold associated with the categorization of an element 47 is equal to 20% uncertainty on the category of the obstacle 22.

In a variant or additionally, the alert module 54 is able to emit an alert signal when the measured lag is above a predetermined alert threshold. The alert threshold is in particular below the lag threshold. For example, the alert threshold is equal to 150 ms.

Thus, the display of an alert message allows the operator to anticipate a potential limiting due to an excessively high lag and for example to reduce the lag by cutting the communication with one of the vehicles 12 of the fleet or to deactivate the communication with at least one sensor 24, 13.

The information receiving module 36, the control module 40, the processing module 42, the limiting module 44, the load shedding module 52 and the alert module 54 are typically made in the form of software stored in a memory (not shown) and able to be executed by a processor (not shown) associated with said memory, the memory and the processor together forming an information processing unit included in the monitoring device 14. In a variant, the information receiving module 36, the control module 40, the processing module 42, the limiting module 44, the load shedding module 52 and the alert module 54 are made in the form of a programmable logic component or in the form of a dedicated integrated circuit included in the monitoring device 14.

Figure 2:
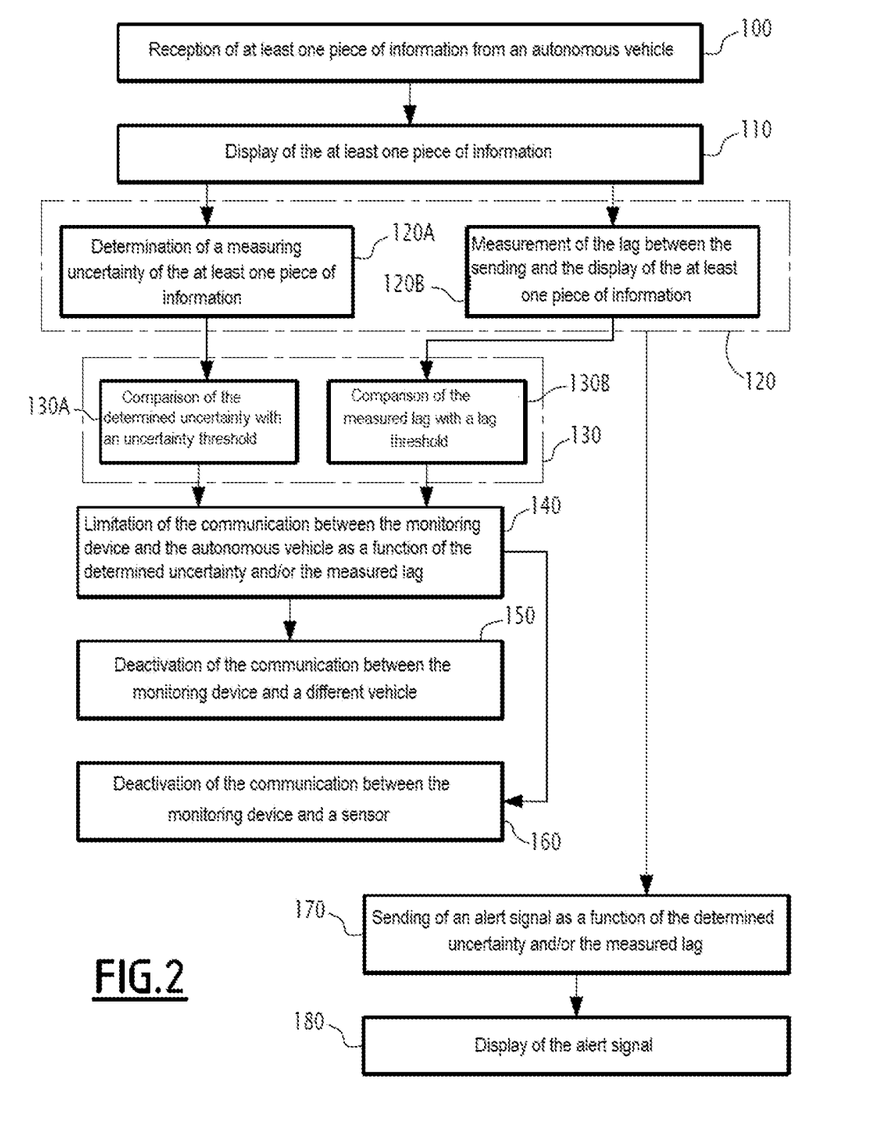
FIG. 2 is a block diagram illustrating a limiting method implemented by a limiting device positioned in a monitoring building of the transport system of FIG. 1.

A limiting method of the remote piloting of a vehicle of interest 46, implemented by the electronic monitoring device 14, will now be described, in reference to FIG. 2.

The limiting method comprises a first step 100 for receiving at least one piece of information from at least one first sensor monitoring the environment of the vehicle of interest 48.

Then, during sub-step 110, the at least one piece of information is displayed on the display screen 38.

The sub-step 110 is followed by a determining and/or measuring step 120.

The step 120 comprises at least one sub-step, advantageously two sub-steps 120A and 120B. Thus, the step 120 comprises only the sub-step 120A or only the sub-step 120B, or both sub-steps 120A and 120B in parallel.

The sub-step 120A is a step for determining a measuring uncertainty of the at least one piece of information sent by the at least one first sensor.

The sub-step 120B is a step for measuring the lag between the sending of the at least one piece of information by the embedded sensor 24 and the display of the at least one piece of information on the display screen 38.

Then the method comprises a comparison step 130.

The step 130 comprises at least one sub-step, advantageously two sub-steps 130A and 130B. Thus, the step 130 comprises only the sub-step 130A or only the sub-step 130B, or both sub-steps 130A and 130B in parallel.

The sub-step 130A follows the sub-step 120A. The sub-step 130A is a step for comparing the determined uncertainty with the uncertainty threshold.

The sub-step 130B follows the sub-step 120B. The sub-step 130B is a step for comparing the measured lag with the lag threshold.

Then, the method comprises a step 140 for limiting the communication between the monitoring device 14 and the vehicle 12 of interest as a function of the determined uncertainty and/or the computed lag.

In particular, during this step 140, the limiting module 44 limits the control module 40 in order to prevent the sending of commands to the vehicle of interest 46.

Then, during an optional sub-step 150, the limiting module 44 deactivates the communication between the monitoring device 14 and at least one of the vehicles 12 of the fleet, in particular different from the vehicle of interest 46 and having a lower safety risk than the vehicle 12 of interest.

In one advantageous embodiment, when the monitoring device 14 receives information from at least two sensors 24, 13, the method also comprises a step 160 for the deactivation of the communication between the monitoring device 14 and at least one of the sensors 24, 13.

In particular, the limiting module 44 deactivates the communication between the monitoring device 14 and the sensor(s) 24, 13 having the lowest criticality level.

The limiting method optionally comprises a step 170 following step 120. This step 170 is a step for emitting an alert signal as a function of the calculated lag and/or the determined uncertainty.

In particular, during this step 170, the alert module 54 sends the alert signal to the at least one display screen 38.

Then, during a step 180, the display screen 38 displays the alert signal.

The alert module 54 advantageously emits an alert signal when the determined uncertainty and/or the measured lag is above a predetermined alert threshold below the uncertainty or lag threshold.

Owing to the invention described above, the safety of the passengers of the vehicle is significantly improved. Indeed, inhibiting the transmission module 30 and/or blocking command sending in case of excessive determined uncertainty and/or measured lag makes it possible to avoid a movement of the vehicle 12 that would not be relevant in light of the current reality of the environment of the vehicle 12.

The invention claimed is:

1. A remote monitoring device for a fleet of autonomous motor vehicles making it possible for an operator to pilot the fleet remotely and comprising at least one display screen, the remote monitoring device being able to receive at least one piece of information from at least a first sensor monitoring the environment of a vehicle of interest in the fleet, the remote monitoring device being able to display the at least one piece of information on the display screen, wherein the remote monitoring device is positioned in a remote control station located at a distance from the autonomous motor vehicles, the remote monitoring device comprising:
a processing module configured to determine a measuring uncertainty of the at least one piece of information sent by the at least one first sensor and/or to measure a lag between the sending of the at least one piece of information by the at least one first sensor and the display of the at least one piece of information on the display screen;
a limiting module configured to limit the piloting of said vehicle of interest by the operator as a function of the determined uncertainty and/or the measured lag; and an alert module configured to emit an alert signal as a function of the determined uncertainty and/or the measured lag, wherein the display screen is configured to display the alert signal.

2. The remote monitoring device according to claim 1, wherein at least one piece of information is chosen from the group consisting of:
- a geographical position of the vehicle of interest;
- a speed of the vehicle of interest;
- an acceleration of the vehicle of interest;
- a geographical position of an element surrounding the vehicle of interest;
- a speed of an element surrounding the vehicle of interest;
- an acceleration of an element surrounding the vehicle of interest; and
- a classification of an element surrounding the vehicle of interest.

3. The remote monitoring device according to claim 2, wherein the element surrounding the vehicle of interest is chosen from the group consisting of:
- an object located in the surroundings of the vehicle of interest;
- an individual located in the surroundings of the vehicle of interest; and
- an obstacle encountered by the vehicle of interest.

4. The remote monitoring device according to claim 1, wherein the limiting module is configured to limit the piloting when at least one of the uncertainties exceeds an associated uncertainty threshold and/or when the measured lag exceeds an associated lag threshold.

5. The remote monitoring device according to claim 1, wherein the monitoring device comprises a control module able to send at least one movement command to at least one vehicle of the fleet, the limiting module being able to block the sending of any movement command to the vehicle of interest.

6. The remote monitoring device according to claim 1, wherein the monitoring device is able to receive at least one piece of information from at least one second sensor, the second sensor being chosen from the group consisting of: a sensor embedded on board one of the autonomous vehicles and an infrastructure sensor positioned outside the autonomous vehicles, the monitoring device comprising a load shedding module able to deactivate the communication between the monitoring device and the at least one second sensor as a function of the determined uncertainty and/or the measured lag.

7. The remote monitoring device according to claim 1, comprising a load shedding module able to deactivate the communication between the monitoring device and at least one of the vehicles of the fleet as a function of the measured lag.

8. A transport system comprising:
- a monitoring device according to claim 1; and
- a fleet of autonomous motor vehicles monitored remotely by the remote monitoring device.

9. A limiting method implemented using a remote monitoring device for a fleet of autonomous motor vehicles, the monitoring device allowing the remote piloting of the fleet by an operator and comprising at least one display screen, wherein the remote monitoring device is positioned in a remote control station located at a distance from the autonomous motor vehicles, the limiting method comprising the following steps:
- receiving at least one piece of information from at least one first sensor monitoring the environment of a vehicle of interest of the fleet;
- displaying the at least one piece of information on a display screen;
- determining a measuring uncertainty of the at least one piece of information sent by the at least one first sensor and/or measuring a lag between the sending of the at least one piece of information by the at least one first sensor and the display of the at least one piece of information on the display screen;
- limiting the piloting of said vehicle of interest by the operator as a function of the determined uncertainty and/or the measured lag; and
- emitting an alert signal as a function of the determined uncertainty and/or the measured lag, wherein the display screen is configured to display the alert signal.

10. A non-transitory computer-readable medium including a computer program product including the software instructions which, when implemented by a piece of computer equipment, carry out the limiting method according to claim 9.

11. A remote monitoring device for a fleet of autonomous motor vehicles making it possible for an operator to pilot the fleet remotely and comprising at least one display screen, the remote monitoring device being able to receive at least one piece of information from at least a first sensor monitoring the environment of a vehicle of interest in the fleet, the remote monitoring device being able to display the at least one piece of information on the display screen, the remote monitoring device comprising:
- a processing module configured to determine a measuring uncertainty of the at least one piece of information sent by the at least one first sensor;
- a limiting module configured to limit the piloting of said vehicle of interest by the operator as a function of the determined uncertainty; and
- an alert module configured to emit an alert signal as a function of the determined uncertainty and/or the measured lag, wherein the display screen is configured to display the alert signal.

12. The remote monitoring device according to claim 11, wherein at least one piece of information is chosen from the group consisting of:
- a geographical position of the vehicle of interest;
- a speed of the vehicle of interest;
- an acceleration of the vehicle of interest;
- a geographical position of an element surrounding the vehicle of interest;
- a speed of an element surrounding the vehicle of interest;
- an acceleration of an element surrounding the vehicle of interest; and
- a classification of an element surrounding the vehicle of interest.

13. The remote monitoring device according to claim 11, wherein the element surrounding the vehicle of interest is chosen from the group consisting of:
- an object located in the surroundings of the vehicle of interest;
- an individual located in the surroundings of the vehicle of interest; and
- an obstacle encountered by the vehicle of interest.

14. The remote monitoring device according to claim 11, wherein the limiting module is configured to limit the piloting when at least one of the uncertainties exceeds an associated uncertainty threshold and/or when the measured lag exceeds an associated lag threshold.

15. The remote monitoring device according to claim 11, wherein the remote monitoring device comprises a control module able to send at least one movement command to at least one vehicle of the fleet, the limiting module being able to block the sending of any movement command to the vehicle of interest.

16. The remote monitoring device according to claim 11, wherein the remote monitoring device is able to receive at least one piece of information from at least one second sensor, the second sensor being chosen from the group consisting of: a sensor embedded on board one of the autonomous vehicles and an infrastructure sensor positioned outside the autonomous vehicles, the remote monitoring device comprising a load shedding module able to deactivate the communication between the remote monitoring device and the at least one second sensor as a function of the determined uncertainty and/or the measured lag.

17. The remote monitoring device according to claim 11, comprising a load shedding module able to deactivate the communication between the remote monitoring device and at least one of the vehicles of the fleet as a function of the measured lag.

* * * * *